United States Patent
Fang et al.

(10) Patent No.: US 6,859,555 B1
(45) Date of Patent: Feb. 22, 2005

(54) FAST DOMINANT CIRCLE DETECTION THROUGH HORIZONTAL AND VERTICAL SCANNING

(75) Inventors: Tong Fang, Piscataway, NJ (US); Ming Fang, Princeton Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 620 days.

(21) Appl. No.: 09/664,937

(22) Filed: Sep. 19, 2000

(51) Int. Cl.[7] .............................................. G06T 7/60
(52) U.S. Cl. ..................................... 382/203; 382/190
(58) Field of Search ................................ 382/181, 190, 382/199, 203, 204, 276, 286, 288, 291

(56) References Cited

U.S. PATENT DOCUMENTS

| | | | | |
|---|---|---|---|---|
| 4,523,188 A | * | 6/1985 | Huber ......................... | 340/734 |
| 5,179,419 A | * | 1/1993 | Palmquist et al. .......... | 356/73.1 |
| 5,502,311 A | * | 3/1996 | Imai et al. ................... | 250/548 |
| 5,825,914 A | * | 10/1998 | Tsuboi et al. ............... | 382/151 |
| 5,892,854 A | * | 4/1999 | de Queiroz et al. ........ | 382/288 |
| 5,995,663 A | * | 11/1999 | Itsuzaki et al. ............. | 382/203 |
| 6,021,222 A | * | 2/2000 | Yamagata ................... | 382/199 |
| 6,198,976 B1 | * | 3/2001 | Sundar et al. ............... | 700/59 |
| 6,724,947 B1 | * | 4/2004 | Hayes ......................... | 382/286 |

FOREIGN PATENT DOCUMENTS

JP          60029878 A   *   2/1985   ............ G06K/9/00

* cited by examiner

*Primary Examiner*—Daniel Miriam
*Assistant Examiner*—Dennis Rosario-Vasquez
(74) *Attorney, Agent, or Firm*—Donald B. Paschburg; F. Chau & Associates, LLC (57) ABSTRACT

A method for determining a circle in an image is disclosed. The method extracts a first pair of edge points along an x-axis of the image, extracts a second pair of edge points along a y-axis of the image, determines an intersection of a first and second line extending perpendicular from a pair of midpoints of the first and second pair of edge points respectively, and determines a radius from the intersection to any edge point.

15 Claims, 5 Drawing Sheets

FAST DOMINANT CIRCLE DETECTION THROUGH HORIZONTAL AND VERTICAL SCANNING

BACKGROUND OF THE INVENTION

1. Field of the Invention

The present invention relates to a method for detecting circles, and more particularly a method for detecting circles in an image using horizontal and vertical scanning.

2. Description of Prior Art

Detecting a circle in an image is a basic task needed for computer vision, for example, in Surface Mounted Device (SMD) inspection applications. Typically, a Hough transform is used for computerized circle and curve detection. The principle of the Hough transform is to detect parameterized curves by mapping image edge pixels into manifolds in a parameter space and finding peaks using a multidimensional histogram procedure. This method, however, is expensive in terms of computation and memory needs. Typically, due to memory storage limitations, this method also has discretization error in both the image and the parameter space.

Recently, several methods have been proposed to improve Hough transform techniques in terms of efficiency, accuracy and memory storage. One modified scheme uses gradient orientation from edge points. The probablisitic Hough transform attempts to reduce redundant information by sampling image data in various ways. The randomized Hough transform is proposed to detect a curve with n parameters by randomly picking n pixels and mapping them into one point in the parameter space, instead of transforming one pixel into a hyperplan in n-dimensional parameter space. Other methods, such as the generalization Hough transform and the decomposed Hough transform, have been proposed to improve Hough transform techniques. However, the above-mentioned methods are Hough transformation based and are therefore, generally slow.

Therefore, a need exists for a fast, accurate, and robust method of dominant circle and ring detection in a given region without transforms (needing less memory).

SUMMARY OF THE INVENTION

In one embodiment of the present invention, a method is disclosed for determining a circle in a region of interest. According to the method, a first edge point pair is extracted along an x-axis of the region of interest, and a second edge point pair is extracted along a y-axis of the region of interest. The method determines an intersection of a first and second line extending perpendicular from a pair of midpoints of the first and second pair of edge points respectively, and determines a radius from the intersection to any edge point. The x-axis and they-axis intersect within the circle.

The method defines the region of interest wherein the circle is completely contained within the region of interest, and the circle is the dominant feature within the region of interest.

In one embodiment of the present invention, the method verifies the edge points by scanning the image along the x-axis of the region of interest, scanning the image along the y-axis of the region of interest, performing a horizontal gradient and a vertical gradient along the x and y-axis of the region of interest respectively, and determining whether a local maximum along the gradients match the coordinates for any edge point. The match is determined by searching from each edge of the region of interest inward to determine the local maximum, and determining whether the local maximum matches the coordinates for any edge point.

In another embodiment of the present invention, the method determines the match by determining a position, relative to the circle of a foreign structure: if the foreign structure are inside, searching from each edge of the region of interest, inward, to determine the local maximum; if the foreign structure are outside, searching from the center of the region of interest, outward, to determine the local maximum; and if the foreign structure is both inside and outside the circle, randomly scan at a plurality of points each axis of the region of interest within ½ of the total axis length, conduct a gradient operation at each point scanned, determine a plurality of potential edge points, calculate a coordinate for center of the circle, save the coordinate in an array, determine, based on the plurality of edge points a median value for each coordinate of the center of the circle. The method further determines whether the local maximum matches the coordinates for any edge point.

The region of interest can be selected manually.

In still another embodiment of the present invention, a method for determining a circle in an image is disclosed wherein the method extracts a first pair of edge points along an x-axis of the image, extracts a second pair of edge points along ay-axis of the image, and determines an intersection of a first and second line extending perpendicular from a pair of midpoints of the first and second pair of edge points respectively.

The method also determines a radius from the intersection to any edge point. According to the present embodiment, the x-axis and they-axis intersect within the circle. According to another embodiment of the present invention, the image contains the whole circle, and the circle being the dominant feature within the image.

The method verifies the edge points by scanning the image along an x-axis, scanning the image along ay-axis, performing a horizontal gradient and a vertical gradient along the x and y-axis respectively, and determining whether a local maximum along the gradients match the coordinates for any edge point. The match is determined by searching from each edge of the image inward to determine the local maximum, and determining whether the local maximum matches the coordinates for any edge point.

In still another embodiment of the present invention the method determines a match by determining a position, relative to the circle of a foreign structure: if the foreign structure are inside, searching from each edge of the image, inward, to determine the local maximum; if the foreign structure are outside, searching from the center of the image, outward, to determine the local maximum; and if the foreign structure is both inside and outside the circle, randomly scan at a plurality of points each axis of the image within ½ of the total axis length, conduct a gradient operation at each point scanned, determine a plurality of potential edge points, calculate a coordinate for a center of the circle, save the coordinate in an array, determine, based on the plurality of edge points a median value for each coordinate of the center of the circle. The method further determines whether the local maximum matches the coordinates for any edge point.

According to another embodiment of the present invention, a computer program product is disclosed including a computer usable medium having computer readable program code embodied therein for causing the computer to detect a circle within an image, the computer readable program code. The computer program product includes computer readable program code for causing the computer to extract a first pair of edge points along an x-axis of the image, computer readable program code for causing the computer to extract a second pair of edge points along a y-axis of the image, computer readable program code for causing the computer to determine an intersection of a first line and a second line extending perpendicular from a midpoint of the first and second edge points respectively, and     computer readable program code for causing the computer to determine a radius from the intersection to any edge point.

According to one embodiment, the computer usable medium also includes computer readable program code embodied therein for causing the computer to verify the edge points, the computer readable program code. The computer program product includes computer readable program code for causing the computer to scan the image along an x-axis, computer readable program code for causing the computer to scan the image along ay-axis, computer readable program code for causing the computer to perform a horizontal gradient and a vertical gradient along the x and y-axis respectively, wherein the x and y-axis intersect within the circle, and computer readable program code for causing the computer to determine whether a local maximum along the gradients match the coordinates for any edge point.

According to yet another embodiment of the present invention, the computer readable program code for causing the computer to determine a match further includes computer readable program code for causing the computer to search from each edge of the image, inward to determine the local maximum, and computer readable program code for causing the computer to determine whether the local maximum matches the coordinates for any edge point.

According to another embodiment, the computer readable program code for causing the computer to determine a match further includes computer readable program code for causing the computer to determine the position, relative to the circle of a foreign structure: if the foreign structures are inside, searching from each edge of the image, inward, to determine the local maximum; if the foreign structures are outside, searching from the center of the image, outward, to determine the local maximum; and if the foreign structure is both inside and outside the circle, randomly scan at a plurality of points each axis of the image within ½ of the total axis length, conduct a gradient operation at each point scanned, determine a plurality of potential edge points, calculate a coordinate for a center of the circle, save the coordinate in an array, determine, based on the plurality of edge points a median value for each coordinate of the center of the circle. The present embodiment also includes computer readable program code for causing the computer to determine whether the local maximum matches the coordinates for any edge point.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to the geometric properties of a circle, a line that intersects the center point of a segment connecting two edge points on a circle, perpendicular to the segment, will also intersect the center of the circle. According to one embodiment of the present invention a method is disclosed for dominant circle detection utilizing the relationship above. The following disclosure will be described with respect to FIG. 1. The circle to be detected 106 is scanned horizontally and vertically through the center of an image 108 or a region of interest (ROI), O(hx, vy). The coordinates for the center of the circle 110, $(x_0, y_0)$, can be obtained from the center of horizontal segment and vertical segment as shown in FIG. 1.

Figure 1:
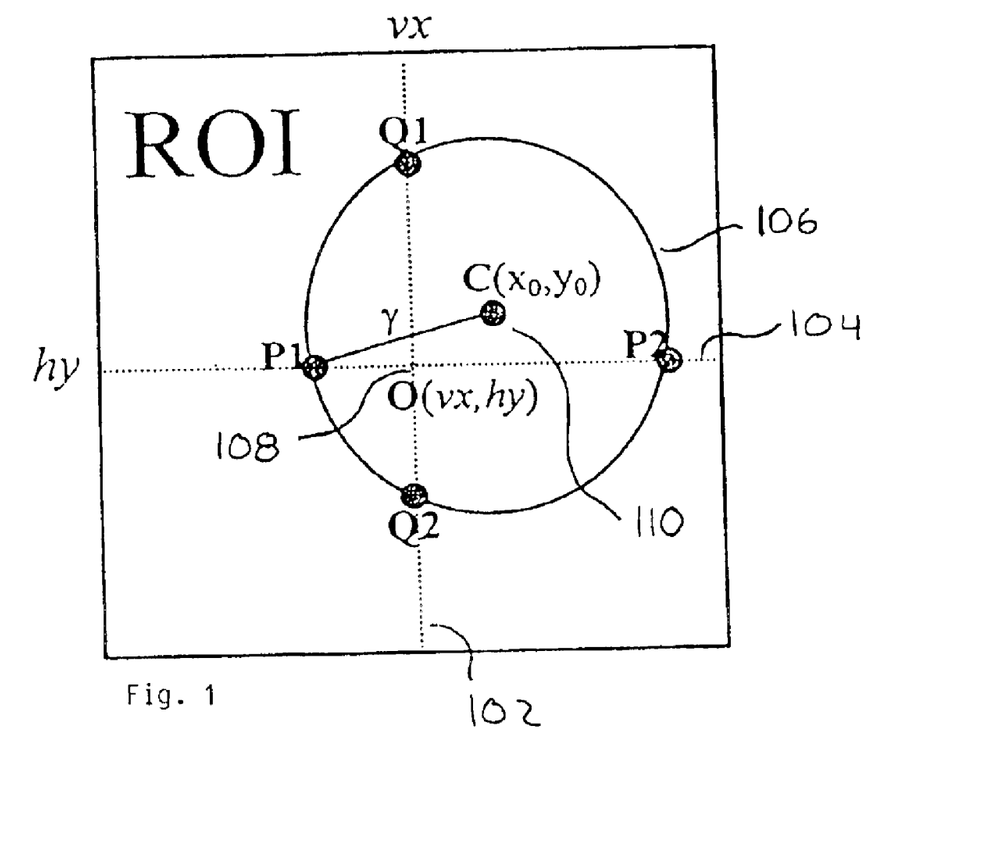
FIG. 1 is a diagram of a region of interest having a circle with parameters according to one embodiment of the present invention.

In FIG. 1, edge points P1($x_1$, $h_y$), P2($x_2$, $h_y$) are end points of a horizontal segment and the edge points Q1($v_r$, $y_1$), Q2($v_x$, $y_2$) are end points of a vertical segment. The following results can be obtained:

$$x0 = x1 + \frac{x2 - x1}{2} \quad (1)$$

$$y0 = y1 + \frac{y2 - y1}{2} \quad (2)$$

$$r = \sqrt{\left(\frac{|P_1 P_2|}{2}\right)^2 + (y0 - hy)^2} = \sqrt{\left(\frac{|Q_1 Q_2|}{2}\right)^2 + (x0 - vx)^2} \quad (3)$$

Where $(x_0, y_0)$ are the coordinates for the center 110 of the detected circle 106 and r is the radius of the detected circle 106.

According to one embodiment of the present invention, the circle 106 to be detected is assumed to be within the ROI. Further, the ROI center 108, O(hx, vy), is assumed to be located inside the circle 106. In some cases it can be difficult to select a ROI to exclude other structures located inside or near the circle in real applications. Typically, ROI's are rectangular, though other shapes are possible. In this case, a rectangular ROI is used. The ROI is selected to reduce the presence of foreign structures to increase the efficiency and robustness of the present invention. The ROI can be selected manually.

According to the present embodiment, edge points P1 and P2 can be extracted by scanning the image horizontally at the position of row hy 104 and conducting a horizontal gradient operation. Similarly, edge points Q1 and Q2 can be extracted by vertical scanning at the position of column vx 102, and conducting a vertical gradient operation. Then by using Equations (1) through (3), the circle parameters can be obtained.

According to another embodiment of the present invention, a method for handling different background situations is presented, e.g., when the background possesses noise and/or other structures inside or outside the circle. In one embodiment of the present invention, a method is disclosed for determining edge points. The following description deals with each successive stage of the method in detail with reference to FIG. 2.

Figure 2:
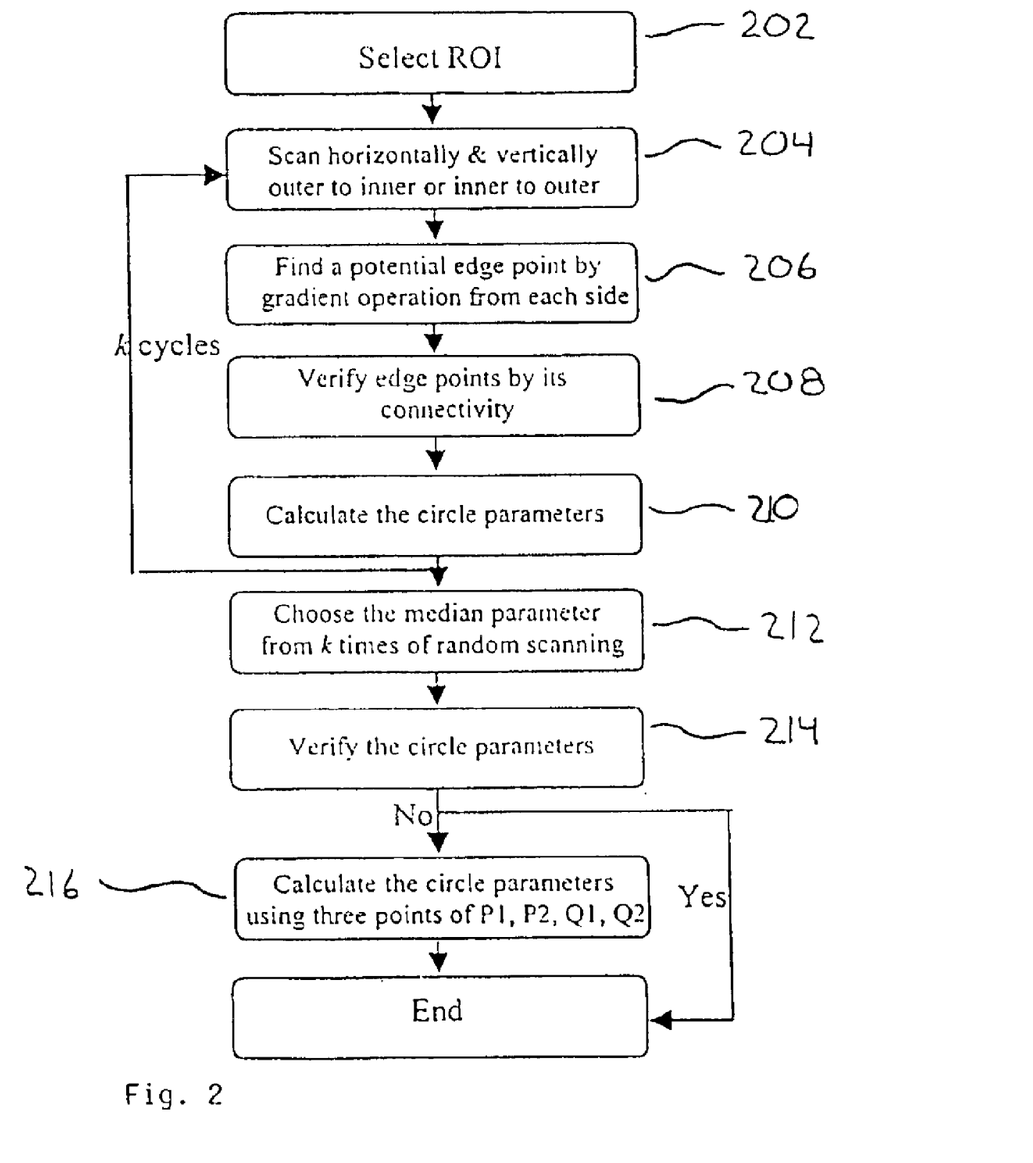
FIG. 2 is a flow chart of a method of circle detection and verification according to another embodiment of the present invention.
Figure 3:
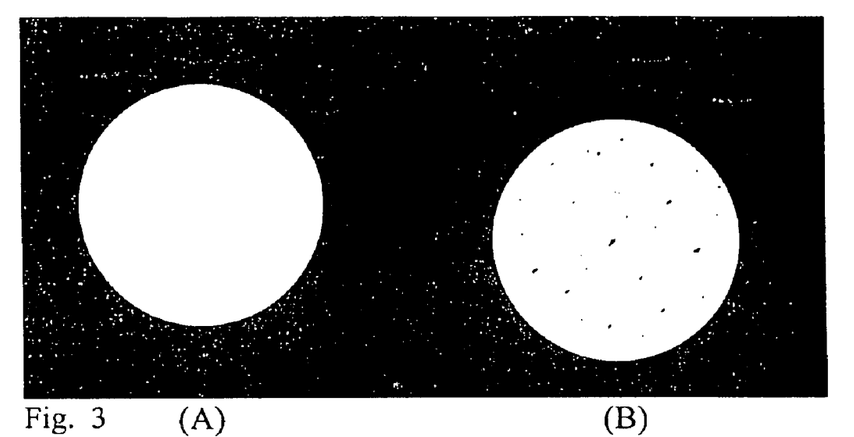
FIG. 3 is an illustration of two circles within images according to yet another embodiment of the present invention.
Figure 4:
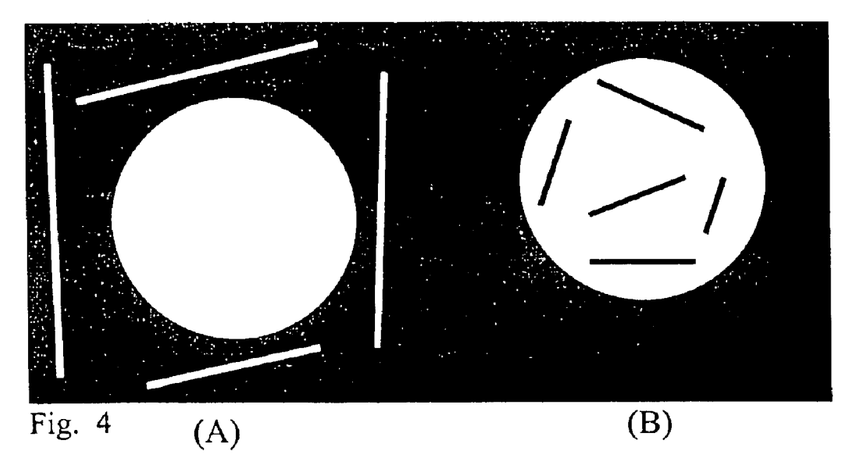
FIG. 4 is an illustration of two additional circles within images having noise according to one embodiment of the present invention.
Figure 5:
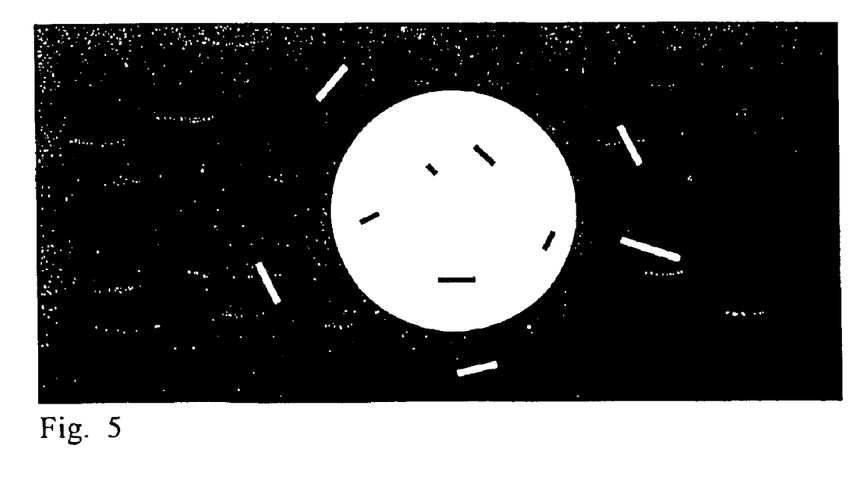
FIG. 5 is an illustration of a circle within images having noise according to one embodiment of the present invention.

A method for fast dominant circle detection is proposed using horizontal and vertical scanning through the center of an image or a region of interest (ROI), O(hx, vy). The coordinates for the center of the circle, $(x_0, y_0)$, can be obtained from the center of horizontal segment and vertical segment. A horizontal and vertical scan 204 is conducted and results in a pixel array. A gradient operation is performed along the horizontal and vertical plains (pixel array), typically the x and y-axis of the ROI. An edge point is the local maximum in a gradient array. The potential edge points are determined 206 for the circle by searching the gradient arrays for local maximums. A connectivity verification procedure 208 is performed to find the true edge points of the circle. The method obtains circle radiuses $\gamma_1$ and $\gamma_2$ 210, calculated from edge points. Given a number of scanning times, k 212, the method randomly scans the image within a row and column range and determines a center $x_0$ 212. The method chooses the median value to be the candidate center $x_0$ 212. The method verifies whether the two radiuses $\gamma_1$ and $\gamma_2$ are equal 214, thus verifying the edge points. If one of the four edge points is not detected accurately, the other three edge points can still be used to calculate the correct circle parameters 216.

In the following paragraphs horizontal scanning is described in detail. Vertical scanning is similar to the horizontal scanning, and involves similar techniques. Given a ROI (202) m×n for circle detection, where m and n are the size of the rows and columns in the ROI respectively, a horizontal scan 204 is conducted at the position of row hy and results in a pixel array $A_{hy}(i)$, where i ∈[1,n]. Then a gradient operation along the horizontal plain is performed to obtain a gradient array $G_{hy}(i)$, where:

$$G_{hy}(i)=|A_{hy}(i)-A_{hy}(i-1)| \quad (4)$$

In general, an edge point, or feature point, is the local maximum in a gradient array. If the background is clean, without any noise, and no structure is located outside the circle, the first local maximum is the left edge point 206 of the circle when searching for the gradient array from left to right. Similarly, the first local maximum is the right edge point 206 when we search from right to left. However, if noise, e.g., speckle noise, exists in the background, the first local maximum may be a noise point. Therefore, a connectivity verification procedure 208 can be performed to find the real edge points of a circle.

Each edge point of a circle has at least two adjacent edge points, where "adjacent" means connected. By checking the neighborhood feature points of the first local maximum, isolated noise points, or pairs of noise points, can be eliminated from the candidate edge points of a circle. For low noise background, a 3×3 window can be implemented for neighborhood connectivity verification. For high noise background, a 5×5 or 7×7 window can be implemented. While the window size does not change, the size of columns and rows will decrease as the number of columns and rows increases (assuming the size of each column and row is equal to every other column and row respectively). Therefore, by increasing the number of columns and rows, the method decreases the likelihood that noise will be found in any one column or row during scanning.

The pseudo-code of connectivity verification 208 is shown below (for horizontal scanning):

```
Scan at row hy to get a row array A_hy(i)
Conduct gradient operation to get a gradient array G_hy(i)
For (i=0; i<n/2; i++) //search from left to right to find the left edge point
{
    If a local maximum is detected Then
        If the connectivity of its neighborhood is TRUE, Then
            Exit    //obtain the left edge point
        Else
            Continue
}
For (i=n-I; i>n/2; i-) //search from right to left to find the right edge point
{
    If a local maximum is detected Then
        If the connectivity of its neighborhood is TRUE, Then
            Exit    //obtain the right edge point
        Else
            Continue
}
```

It is also possible that some foreign structures are located inside or outside the circle. If the structures are only located inside or outside the circle, then the method can detect the circle by conducting outer to inner scanning or inner to outer scanning, respectively. For example, if all foreign structures are located outside the circle, by searching for the local maximum from inner circle to outer circle, the first local maximum with connectivity will be an edge point. The pseudo-code for two scanning modes according to one embodiment of the present invention are shown below (for horizontal scanning only):

```
If outer to inner mode, Then
{
    For (1=0; i<n/2; i++)
        Find the left edge point
    For (i=n-I; i>n/2; i-)
        Find the right edge point
}
If inner to outer mode, Then
{
    For (i=n/2; i>0; i-)
        Find the left edge point
    For (i=n/2; i>n; i-)
        Find the right edge point
}
```

However, if foreign structures are located inside and outside the circle simultaneously, the method performs random scanning around the center of ROI. For horizontal scanning, given the number of scanning times k 212, the method randomly scans the image within the row range of [hy-δ, hy+δ] with δ≦m/4. For each scanning array, the method extracts the left and right edge points. The center $x_0$ is calculated using Equation (1). The center $x_0$ is written to a new array X. The method also sorts the array and chooses the median value to be the candidate center $x_0$ 212. The pseudo-code of random horizontal scanning is shown below:

```
For (i=0; i<k; i++)
{
    Random select a row value t, which t ∈ [hy - δ, hy + δ]
    Horizontal scan at row t to get a row array A_t(i)
    Conduct gradient operation to get a gradient array G_t(i)
    Find the left edge point and right edge point
```

-continued

```
    Calculate x₀
    X[i]=x₀
}
sort the center array X[i]
x₀=X[k/2]
```

As stated above, according to Equation (3), the method obtains circle radiuses $\gamma_1$ and $\gamma_2$ 210, calculated from P1, P2 and Q1, Q2 separately and respectively. The method verifies whether the two radiuses $\gamma_1$ and $\gamma_2$ are equal 214. If foreign structures, such as long lines, exist inside and outside the circle simultaneously, it is possible that the two radiuses $\gamma_1$ and $\gamma_2$ are not equal. This is because one or more edge points may not be real or true. However, if only one of the four edge points is not detected accurately, the other three edge points can still be used to calculate the correct circle parameters 216. The pseudo-code of circle parameter verification is shown below:

```
Boolean SUCCESS; //variable definition
    Horizontal scan to get P1, P2
    Vertical scan to get Q1, Q2
    Calculate the circle parameters, x₀, y₀, γ₁ and γ₂
    If (γ₁ ≠γ₂) Then
        Do{
            Choose three point of P1, P2, Q1, and Q2
                To calculate the circle parameter
            Calculate the fourth edge point
            If(the calculated edge point is a real edge point
            of circle) Then
                SUCCESS=TRUE;
                Exit
        }While(SUCCESS=FALSE)Or(not all points are checked)
```

If two or more edge points are not detected correctly, a Hough transform based approach can be used.

Compared with the conventional Hough transform and other circle detection methods, the present invention has the following advantages:

High computational speed, typically the method does not conduct Hough transform. The computational speed is faster than the conventional Hough transform and other circle detection approaches. Running on a 200 MHz computer, the average execution time of the circle detection method is about 15 µs.

Less memory, the present method does not conduct a transform, all computations are focused on scanning several lines in the ROI, therefore, less memory is needed.

High parameter resolution, the present method uses a method which obtains circle parameters without discretization.

Ring Detection, since that are two scanning modes in the present invention, it can be extended to detect a ring. It can also be used to verify whether two circles have the same center.

Figure 6:
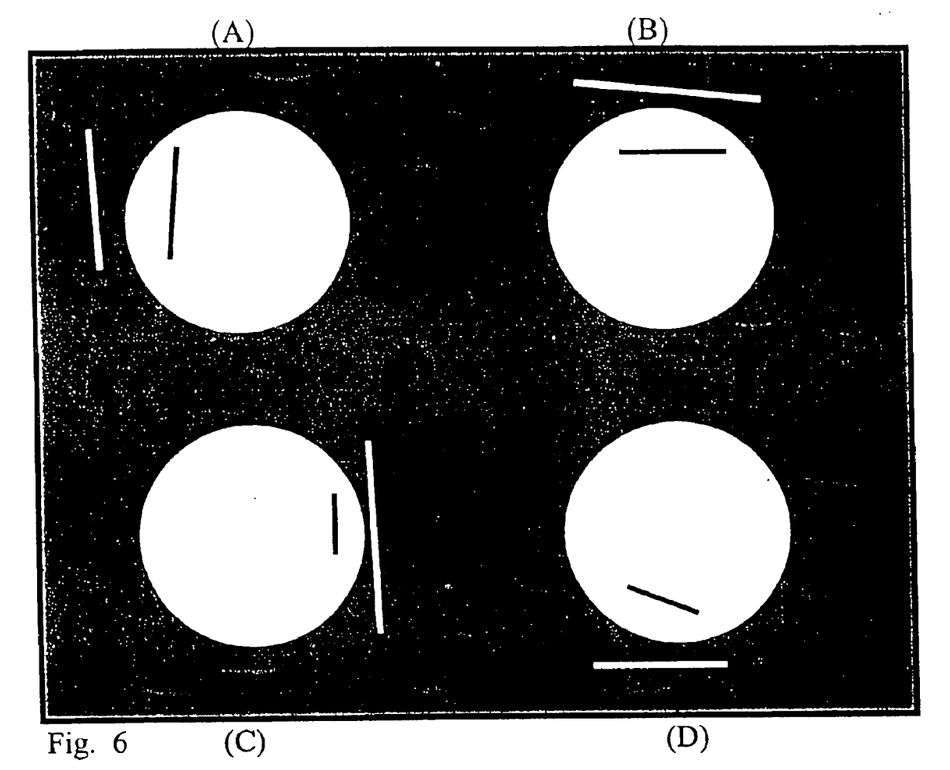
FIG. 6 is an illustration of four circles within images having noise according to still another embodiment of the present invention.
Figure 7:
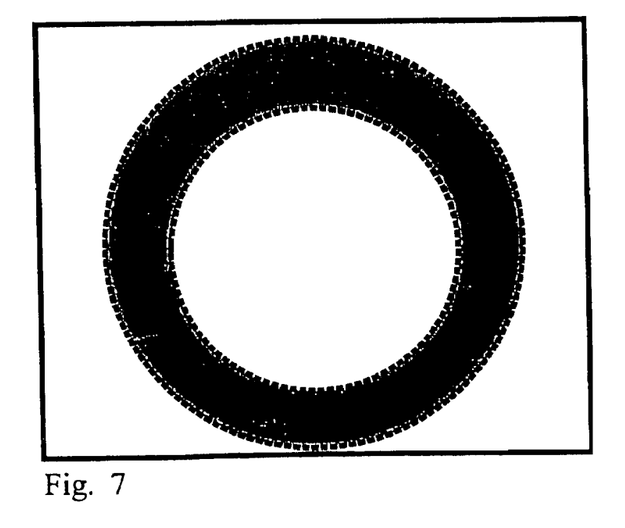
FIG. 7 is an illustration of an image having two circles within the same image.
Figure 8:
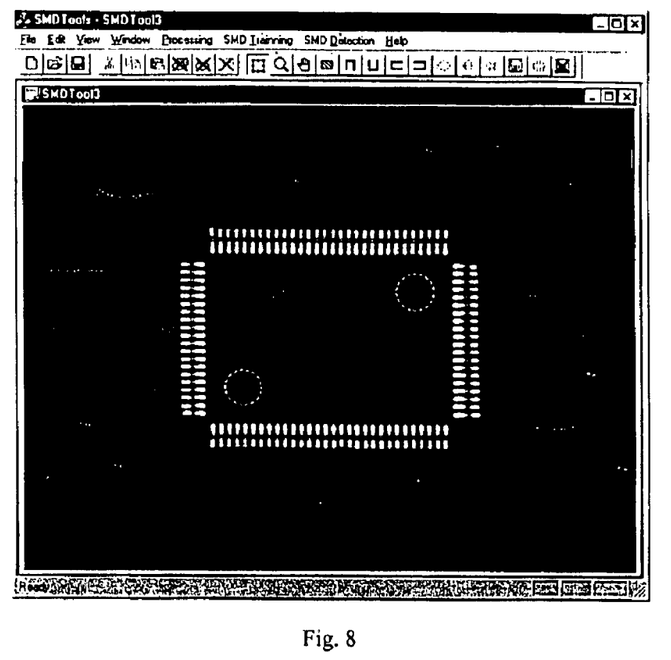
FIG. 8 is an illustration of detected circles within an image according to one embodiment of the present invention.
Figure 9:
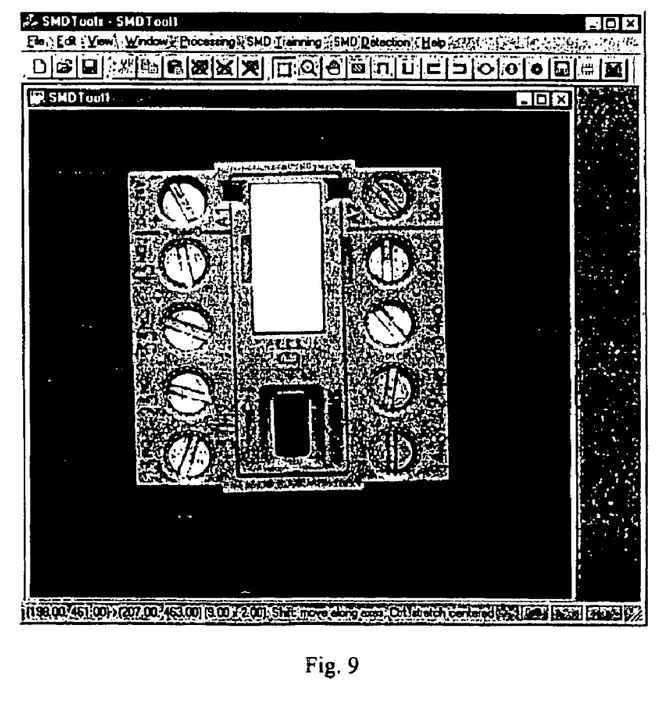
FIG. 9 is another illustration of detected circles within an image according to an embodiment of the present invention.

The present invention can be implemented in any computer language, for example, visual C++/MFC with a friendly user interface. FIGS. 3 through 7 show the circle detection results of artificial images. FIG. 8 and FIG. 9 show the circle detection results of real images. According to one embodiment of the present invention, a broken line indicates a circle within the image located by the method. Circles may be indicated in other ways, for example, by lead lines or shading.

FIG. 3a shows an ideal circle image. Using the present invention, the circle can be detected. FIG. 3b shows a circle with speckle noise. By checking the connectivity of edge points, the present invention detects the circle. A circle with foreign structures only outside (inside) the circle is shown in FIG. 4a (4b). Using inner to outer and outer to inner mode of scanning, the present invention can detect these circles simultaneously. The circle can be detected through random scanning horizontally and vertically. In FIG. 6, large structures exist inside and outside the circle. As a result, one of the edge points is not detected correctly. The misdetected edge point in FIG. 6a is the left edge point, in FIG. 6b the top edge point, in FIG. 6c is the right edge point, and in FIG. 6d is the bottom edge point, respectively. Using the other three edge points, the method calculates the circle parameters and detects the circle. FIG. 7 shows an example of ring detection using two scanning modes.

A method for fast dominant circle detection is proposed using horizontal and vertical scanning. Compared to the conventional Hough transform and its derived methods for circle detection, the present invention has several advantages, for example, computational speed. The proposed circle detection method is also very robust to deal with noise and foreign structures. It is suitable for many industrial inspection applications, such as the SMD and machine parts inspection, as well as computer vision generally.

Having described embodiments for a method of detecting a circle within an image, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patens is set for in the appended claims:

What is claimed is:

1. A method for determining a circle in a region of interest comprising the steps of:

extracting a first pair of edge points along an x-axis of the region of interest;

extracting a second pair of edge points along a y-axis of the region of interest;

determining an intersection of a first and second line extending perpendicular from a pair of midpoints of the first and second pair of edge points respectively;

determining a radius from the intersection to any edge point;

verifying a connectivity of the first and second pair of edge points in the presence of a foreign structure in the region of interest, wherein verifying comprises:

scanning the image along the x-axis of the region of interest, scanning the image along the v-axis of the region of interest, performing a horizontal gradient and a vertical gradient along the x and y-axis of the region of interest respectively, and determining whether a local maximum along the gradients match the coordinates for any edge point comprising:

determining a position, relative to the circle of the foreign structure, wherein if the foreign structure is inside, searching from each edge of the region of interest, inward, to determine the local maximum, if the foreign structure is outside, searching from the center of the region of interest, outward, to determine the local maximum, and if the foreign structure is both inside and outside the circle, randomly scan at a plurality of points each axis of the region of interest within ½ of the total axis length, conduct a gradient operation at each point scanned, determine a plurality of potential edge points, determine a coordinate for center of the circle, save the coordinate in an array, determine, based on the plurality of edge points a median value for each coordinate of the center of the circle; and determining the circle upon verifying the connectivity of the first and second pair of edge points.

2. The method of claim 1, wherein the x-axis and the y-axis intersect within the circle.

3. The method of claim 1, wherein the circle is completely contained within the region of interest, and the circle is the dominant feature within the region of interest.

4. The method of claim 1, wherein the step of determining the match comprises the steps of:

searching from each edge of the region of interest, inward to determine the local maximum; and determining whether the local maximum matches the coordinates for any edge point.

5. The method of claim 1, wherein the region of interest is selected manually.

6. A method for determining a circle in an image, comprising the steps of:

extracting a first pair of edge points along an x-axis of the image;

extracting a second pair of edge points along a y-axis of the image;

determining an intersection of a first and second line extending perpendicular from a pair of midpoints of the first and second pair of edge points respectively;

verifying each edge point by verifying a connectivity of adjacent edge points in a gradient array of the image in the presence of a foreign structure visible in the image, wherein verifying comprises:

scanning the image along the x-axis, scanning the image along the v-axis, performing a horizontal gradient and a vertical gradient along the x and y-axis respectively, and determining whether a local maximum along the gradients match the coordinates for any edge point, comprising:

determining a position, relative to the circle of the foreign structure, wherein if the foreign structure are inside, searching from each edge of the image, inward, to determine the local maximum, if the foreign structure are outside, searching from the center of the image, outward, to determine the local maximum, and if the foreign structure is both inside and outside the circle, randomly scan at a plurality of points each axis of the image within ½ of the total axis length, conduct a gradient operation at each point scanned, determine a plurality of potential edge points, calculate a coordinate for a center of the circle, save the coordinate in an array, determine, based on the plurality of edge points a median value for each coordinate of the center of the circle; and determining the circle by comparing radiuses from at least two edge points to the intersection.

7. The method of claim 6, further comprising the step of determining a radius from the intersection to any edge point.

8. The method of claim 6, wherein the x-axis and the y-axis intersect within the circle.

9. The method of claim 8, wherein the image contains the whole circle, and the circle being the dominant feature within the image.

10. The method of claim 6, wherein the step of determining the match comprises the steps of:

searching from each edge of the image, inward to determine the local maximum; and determining whether the local maximum matches the coordinates for any edge point.

11. A computer program product comprising:

a computer usable medium having computer readable program code embodied therein for causing the computer to detect a circle within an image, the computer readable program code in the computer program product comprising:

computer readable program code for causing the computer to extract a first pair of edge points along an x-axis of the image;

computer readable program code for causing the computer to extract a second pair of edge points along a y-axis of the image;

computer readable program code for causing the computer to determine an intersection of a first line and a second line extending perpendicular from a midpoint of the first and second edge points respectively;

computer readable program code for causing the computer to determine a radius from the intersection to any edge point;

computer readable program code for causing the computer to determine the circle by verifying a connectivity of adjacent edge points in a gradient array of the image in the presence of a foreign structure visible in the image comprising:

computer readable program code for causing the computer to scan the image along an x-axis, computer readable program code for causing the computer to scan the image along a v-axis, computer readable program code for causing the computer to perform a horizontal gradient and a vertical gradient along the x and y-axis respectively wherein the x and y-axis intersect within the circle, and computer readable program code for causing the computer to determine whether a local maximum along the gradients match the coordinates for any edge point, comprising:

computer readable program code for causing the computer to determine the position, relative to the circle of the foreign structure, wherein if the foreign structures are inside, searching from each edge of the image, inward, to determine the local maximum, if the foreign structures are outside, searching from the center of the image, outward, to determine the local maximum, and if the foreign structure is both inside and outside the circle, randomly scan at a plurality of points each axis of the image within ½ of the total axis length, conduct a gradient operation at each point scanned, determine a plurality of potential edge points, calculate a coordinate for a center of the circle, save the coordinate in an array, determine, based on the plurality of edge points a median value for each coordinate of the center of the circle; and computer readable program code for causing the computer to verify the circle by comparing radiuses from at least two edge points to the intersection.

12. The computer usable medium of claim 11, wherein the computer readable program code for causing the computer to determine a match further comprises:

computer readable program code for causing the computer to search from each edge of the image, inward to determine the local maximum; and computer readable program code for causing the computer to determine whether the local maximum matches the coordinates for any edge point.

13. The method of claim 6, further comprising, determining the circle upon determining a connectivity of the first and second pair of edge points.

14. The computer usable medium of claim 11, further comprising, computer readable program code for determining the circle upon determining a connectivity of the first and second pair of edge points.

15. The method of claim 1, further comprising verifying the circle by comparing radiuses from at least two edge points to the intersection.

* * * * *